Figure 1:
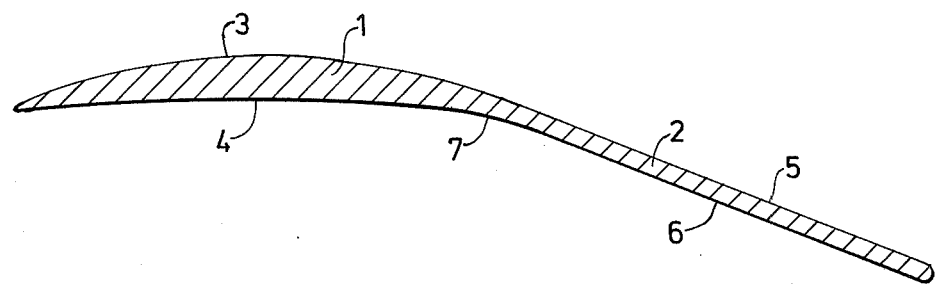

United States Patent [19]

Kolecki

[11] 4,451,208

[45] May 29, 1984

[54] PROPELLER

[76] Inventor: Jerzy Kolecki, Osbyringen 48, S-163 05 Stockholm, Sweden

[21] Appl. No.: 496,527

[22] Filed: May 23, 1983

Related U.S. Application Data

[63] Continuation of Ser. No. 275,266, Jun. 19, 1981, abandoned.

[51] Int. Cl.³ .................. B64C 11/16; B64C 27/46
[52] U.S. Cl. ........................ 416/237; 428/586;
428/587; 29/156.8 P; 148/16.5
[58] Field of Search ............... 416/237; 428/587–586;
29/156.8 P; 148/16.5

[56] References Cited

U.S. PATENT DOCUMENTS

| | | | |
|---|---|---|---|
| 1,692,081 | 11/1928 | De La Cierva | 416/237 A |
| 1,831,373 | 11/1931 | Squires | 148/16.5 |
| 1,853,607 | 4/1932 | Ferreby | 416/237 |
| 2,214,622 | 9/1940 | Lorenzeu | 416/237 |
| 3,660,882 | 5/1972 | Widonitz et al. | 29/156.8 P |
| 3,951,611 | 4/1976 | Morrill | 428/587 |

FOREIGN PATENT DOCUMENTS

| | | | |
|---|---|---|---|
| 350859 | 6/1931 | United Kingdom | 29/156.8 P |
| 741797 | 12/1955 | United Kingdom | 416/237 |

Primary Examiner—Veronica O'Keefe
Attorney, Agent, or Firm—Kinzer, Plyer, Dorn & McEachran

[57] ABSTRACT

A propeller comprises a first elongate, non-twisted part (1) of streamlined cross-section and of constant cross-sectional area and constant shape from one end of said part to its other, and a second, planar part (2) which connects with one longitudinally extending edge of the first part and which is of constant thickness and breadth. The second part (2) has a surface (5) which merges at least substantially tangentially with one, convex single-curve surface (3) of the first part, and a surface 6 which merges smoothly with the other surface (4) of the first part (1).

4 Claims, 6 Drawing Figures

PROPELLER

This application is a continuation of application Ser. No. 275,266, filed June 19, 1981 now abandoned.

The present invention relates to a blade-profile blank for a propeller and a propeller obtained from the blank.

It is well known that for each engine used to drive, for example, a light aircraft, a hydrocopter or the like the engine speed and the engine power constitute those parameters which determine the design of the propeller blade. A normal propeller blade is twisted so that its pitch is constant at any given transverse section, which means that a propeller becomes very expensive unless it can be manufactured in great numbers.

Consequently, a prime object of the invention is to provide a blade-profile blank which is particularly cheap to manufacture and which can be readily worked to obtain a propeller having practically any desired constant pitch within a very wide range.

Such a propeller blade can be produced cheaply and enables propellers for light aircraft, wind-power plants, industrial fans etc. to be manufactured at relatively low costs.

Figure 2:
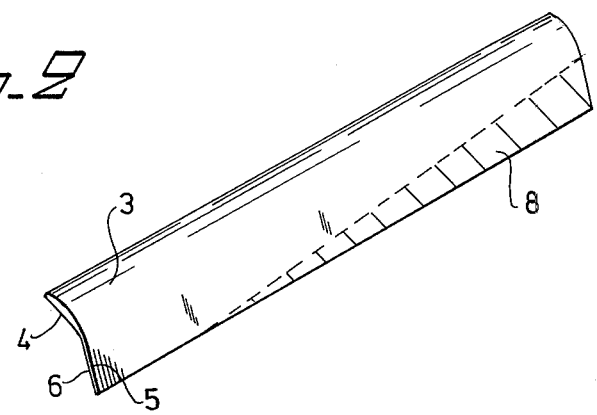
Figure 3:
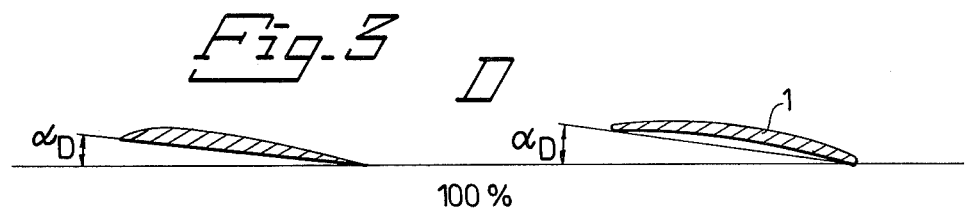
Figure 3:
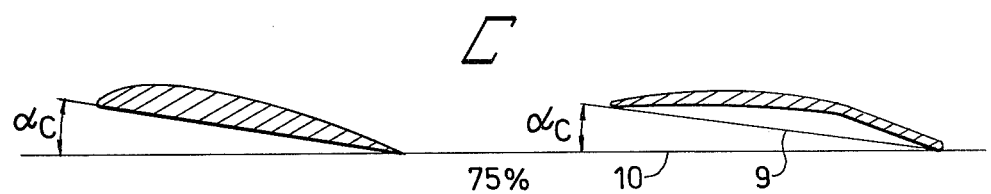
Figure 3:
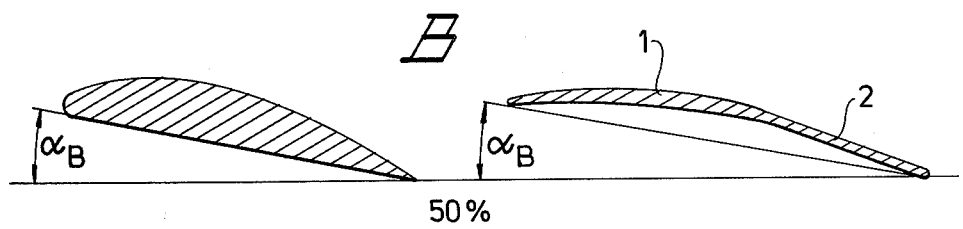
Figure 3:
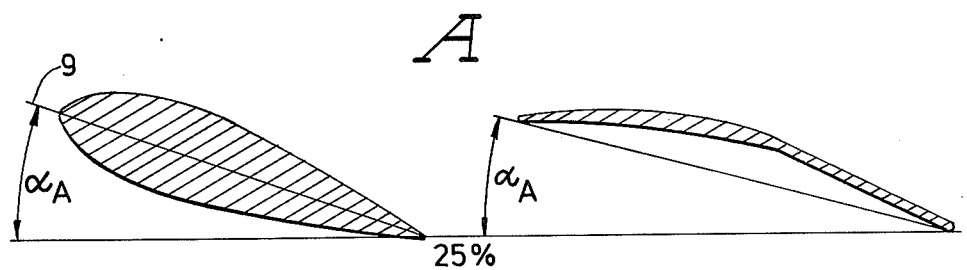
Figure 4:
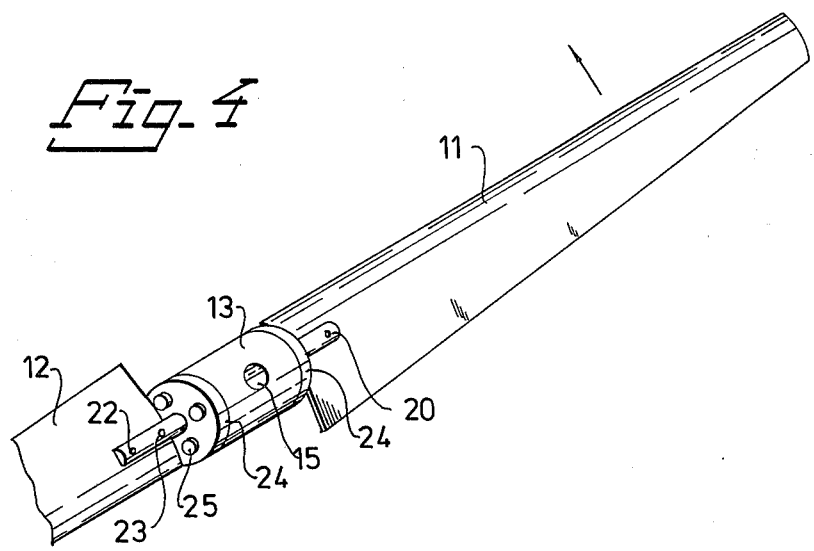
Figure 5:
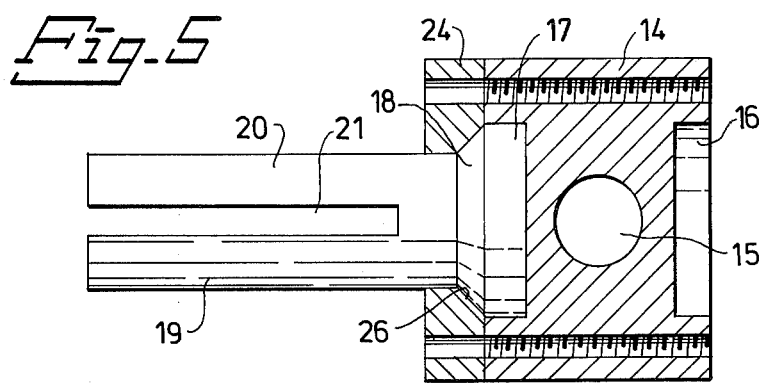
Figure 6:
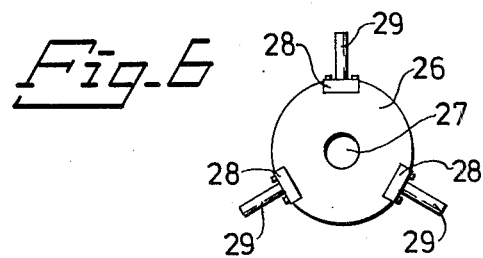

The invention will now be described in more detail with reference to the accompanying drawings, in which FIG. 1 is a sectional view of a blade-profile blank according to the invention, taken at right angles to the longitudinal direction of the blank, FIG. 2 is a perspective view of a blade profile according to the invention, shown in larger scale than in FIG. 1, FIG. 3 is a sectional view of a conventional propeller blade and of a corresponding propeller blade produced from a blank according to the invention, FIG. 4 illustrates part of a two-bladed propeller produced from blanks according to the invention, FIG. 5 is an axial sectional view of the propeller hub of the propeller illustrated in FIG. 4, and FIG. 6 illustrates a hub for a three-bladed propeller, seen in the direction of the axis of rotation.

FIG. 1 is a sectional view of a blade-profile blank according to the invention in approximately double scale. The blade profile illustrated in smaller scale in FIG. 2 comprises, for example, a hardened aluminium alloy which has been drawn to produce straight profiles of uniform thickness and breadth and a cross-sectional shape such as that shown by way of example in FIG. 1.

The profile comprises a first, streamlined leading edge part 1 which along one imaginary edge merges with a second trailing edge part 2 of constant thickness and width. The second trailing edge part 2, which by suitable working is to provide the desired pitch angles along the blade, is made as thin as possible, to facilitate removal of material and to make it as light as possible. The thickness of the second trailing edge part 2 of the profile illustrated in FIG. 1 may be 1.5 mm. The first leading edge part 1 has a maximum thickness of 4 mm and a width of 50 mm. In the illustrated embodiment, the upper surface 3 is defined by a circular arc whose centre lies in a plane passing through the centre of the first part 1, while the lower surface 4 of said first edge part 1 is also defined by a circular arc whose centre lies in said plane. As will be understood, however, the surfaces 3 and 4 can be formed in any suitable manner whatsoever. The second blade trailing edge part 2 has two planar, mutually parallel, or at least substantially parallel, surfaces 5 and 6, of which the surface 5 merges substantially tangentially with the surface 3, to provide the desired streamline properties of the blade. The surface 6 merges with the surface 4 through a smooth curve 7. In the illustrated embodiment, the part 2 of the profile has a width of about 45 mm. The angle between the second trailing edge part 2 of the illustrated profile and the lower surface 4 is about 20°, but can be varied according to the rotational speeds for which the finished propeller is intended.

In FIG. 2, the part 8 shown in dash lines illustrates the area to be removed from the second trailing edge part 2 in order to obtain a desired pitch on a propeller.

On the left of FIG. 3 there are shown four sections of a conventional, twisted propeller blade, said sections being taken from the blade tip at a distance of 100% of the blade length from the hub (section D), at a distance of 75% of the blade length from the hub (section C), at the centre of the blade, 50% of the blade length (section B), and at a distance of 25% of the blade length from the hub (section A). Shown to the right of FIG. 3 are corresponding blade sections A, B, C and D of a blade profile according to the invention, said second blade trailing edge part 2 being worked by removing material from within, for example, the region 8 shown in FIG. 2. In order to obtain a constant pitch, the angle of attack $\alpha$ will, as is known, vary along the whole of the blade length and increase towards the hub, because the speed of rotation of the blade is greatest at the blade tip, i.e. at section D.

The angle $\alpha$ is measured between a line drawn between the longitudinal edges of the blade, the chord 9, and a line 10 extending at right angles to the axis of rotation of the propeller.

It will be seen that a propeller blade having the same constant pitch as the twisted conventional blade shown to the left of FIG. 3 and the same angles of attack $\alpha_A$—$\alpha_D$ can only be obtained from the straight, non-twisted profile blank according to the invention, by removing material from the thin profile trailing edge part 2 of uniform thickness.

It should be emphasized here that the profile of the illustrated part 1 can be modified in many different ways, and the surface 4, for example, may be made completely flat if desired, or may, for example, have the same radius as the curved surface 3. The convex, single-curve surface 3 need not be symmetrical as described, but may, for example, have a wing profile form of the kind illustrated in section D to the left of FIG. 3.

When practicing the invention, a propeller can be produced very quickly, even by unskilled workmen, since all that is required is access to the relatively inexpensive blade blank according to the invention and data concerning the width of the blade at some sections. If a blade should become damaged, all that is necessary is to take the width measurements of the undamaged blade and mark these measurements on a blade blank, and then saw and grind the part 8 (FIG. 2) away.

FIG. 4 illustrates part of a propeller having two blades 11 and 12 and manufactured from a blank according to FIGS. 1 and 2. The two blades 11 and 12 are twistably mounted on a hub 13. As will be seen from FIG. 5, the hub comprises a cylindrical body 14 having a central bore 15 for receiving the engine shaft. Provided in the cylindrical body 14 are two cylindrical recesses 16 arranged to rotatably receive a cylindrical part 17 of a head 18. The head 18 forms part of a bifurcate element having two legs 19 and 20 which form therebetween a gap 21 into which one end of respective propeller blades 11, 12 can be inserted and fastened by means of bolts 22, 23 (FIG. 4). The head 18 has an outer part in the form of a straight truncated cone which is co-axial with the cylindrical part 17 and which co-acts with a conical surface located on the inner surface of a cover plate 24. The cover 24 is secured to the cylindrical body 14 by means of bolts 25 and is through-passed by respective bifurcate elements. By loosening the bolts 25, a bifurcate element together with its associated propeller blade 11, 12 can be rotated continuously and smoothly to adjust the pitch for optimal use of the engine. Subsequent to setting the desired pitch, the head 18 of respective bifurcate elements is secured by tightening the bolts 25, the conical surface on said head 18 being urged against the conical surface 26 on respective covers 24, so as to positively lock the head 18 in the set position.

FIG. 6 is a simplified view of a hub 26 of the same kind as that illustrated in FIG. 5, but intended for a three bladed propeller. The hub 26 has a central bore for receiving the engine shaft, and sunk into the hub are three pressure plates or cover plates 28 corresponding to the cover plates 24 of the FIG. 5 embodiment. Propeller blade attachment means 29 may also have the form of the bifurcate elements 19,20 shown in FIG. 5, or any other suitable form. Each attachment means 29 has an inner head with a conical surface arranged to co-act with a conical surface in respective covers 28, as described with reference to FIG. 5.

I claim:

1. A propeller blade having:
   an elongated, straight, leading edge portion which is streamlined in cross-section and is of constant cross sectional area and shape from its hub end to its tip,
   a straight planar trailing edge portion formed integrally with the leading edge portion, the trailing edge portion merging with one longitudinal edge of the leading edge portion and extending along the entire length of this edge,
   the trailing edge portion having substantially constant thickness which is less than that of the leading edge portion,
   the trailing edge portion having its maximum width at its hub end and its minimum width at its tip.

2. The propeller blade of claim 1 in which the width of the trailing edge portion diminishes uniformly from its maximum width to its minimum width.

3. A propeller according to claim 1 in which the leading edge portion has a convex, single curved surface which is defined at right angles to the longitudinal distance of the blade by a circular arc.

4. A blade according to claim 3 in which the other surface of the leading edge portion is defined at right angles to the blade by a circular arc.

* * * * *